(12) United States Patent
Hoffmann et al.

(10) Patent No.: US 7,111,885 B1
(45) Date of Patent: Sep. 26, 2006

(54) PORTABLE TAILGATE EXTENSION DEVICE

(76) Inventors: Carlos G. Hoffmann, 21502 Dalton Spring, Katy, TX (US) 77449; German G. Hoffmann, 800 Country Pl., #608, Houston, TX (US) 77079

( * ) Notice: Subject to any disclaimer, the term of this patent is extended or adjusted under 35 U.S.C. 154(b) by 0 days.

(21) Appl. No.: 11/154,286

(22) Filed: Jun. 16, 2005

(51) Int. Cl.
*B62D 33/08* (2006.01)
(52) U.S. Cl. .................................. 296/26.11
(58) Field of Classification Search ............ 296/26.11, 296/26.08, 37.6, 50, 51
See application file for complete search history.

(56) References Cited

U.S. PATENT DOCUMENTS

| | | | |
|---|---|---|---|
| 5,468,038 A | | 11/1995 | Sauri |
| 5,752,800 A | * | 5/1998 | Brincks et al. ............. 414/537 |
| 5,775,759 A | * | 7/1998 | Cummins .................. 296/57.1 |
| 5,826,932 A | | 10/1998 | DeSimone |
| 5,857,724 A | | 1/1999 | Jarman |
| 6,082,801 A | | 7/2000 | Owen et al. |
| 6,193,294 B1 | * | 2/2001 | Disner et al. ............ 296/26.11 |
| 6,257,637 B1 | * | 7/2001 | Reed ........................ 296/26.08 |
| 6,340,190 B1 | * | 1/2002 | Rosebrugh et al. ...... 296/26.11 |
| 6,364,391 B1 | * | 4/2002 | Everett ........................ 296/51 |
| 6,378,926 B1 | * | 4/2002 | Renze et al. ............. 296/26.11 |
| 6,422,627 B1 | * | 7/2002 | Kuhn et al. ................ 296/26.1 |
| 6,550,836 B1 | | 4/2003 | Rigau |
| 6,550,841 B1 | | 4/2003 | Burdon et al. |
| 6,641,190 B1 | * | 11/2003 | Kirchhoff ................ 296/26.11 |
| 6,913,305 B1 | * | 7/2005 | Kern et al. .................... 296/51 |
| 6,942,268 B1 | * | 9/2005 | Vejnar ..................... 296/26.11 |
| 2002/0121794 A1 | | 9/2002 | Vejnar |
| 2003/0127873 A1 | * | 7/2003 | Reed ........................ 296/26.08 |
| 2005/0006921 A1 | * | 1/2005 | Chumley et al. ............. 296/75 |

* cited by examiner

*Primary Examiner*—H Gutman
(74) *Attorney, Agent, or Firm*—Egbert Law Offices

(57) ABSTRACT

An extension apparatus for attachment to a tailgate of a vehicle has a first panel with a generally flat surface, a second panel hingedly connected to the first panel. The second panel is movable between a first position in surface-to-surface contact with first panel and a second position in coplanar relationship to the first panel. At least one strap is provided for securing the first panel to a surface of the tailgate.

17 Claims, 4 Drawing Sheets

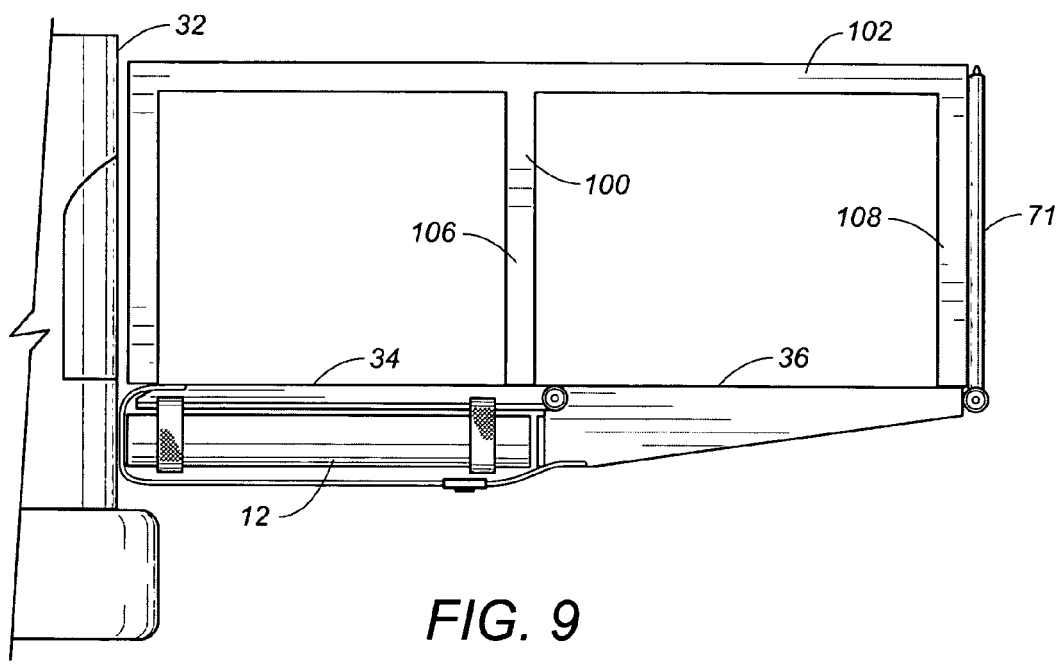
FIG. 9
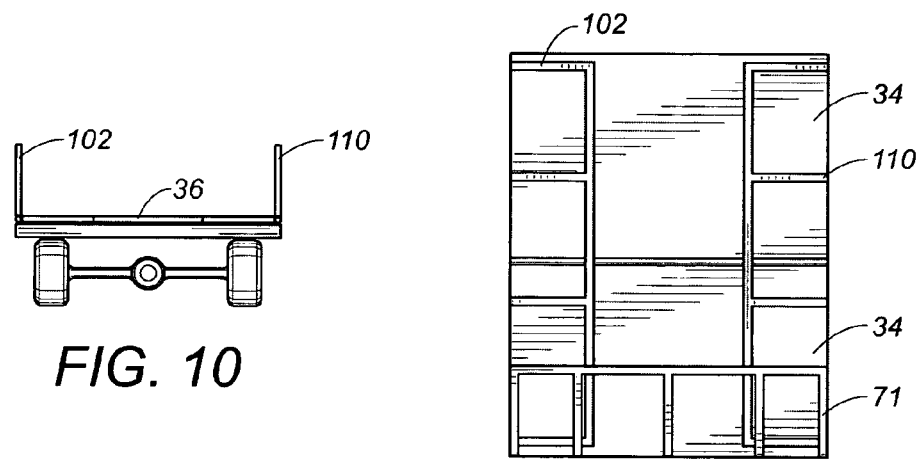
FIG. 10
FIG. 11

PORTABLE TAILGATE EXTENSION DEVICE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to devices for extending the cargo area of the bed of a pickup truck. More particularly, the present invention relates to tailgate extension devices. More particularly, the present invention relates to tailgate extension devices that can be transportable and removable.

BACKGROUND OF THE INVENTION

Pickup trucks and similarly configured vehicles are equipped with a cargo bed in which cargo of a variety of sorts can be transported. A limitation on the versatility of such vehicles arises when the cargo to be transported is longer than the cargo bed, and this projects from the end of the vehicle. The situation frequently occurs when transporting construction materials and machinery. This prompts significant practical and safety concerns during transportation of the cargo. For instance, the cargo can be damaged if its weight causes the portion projecting beyond the bed to become deformed. Furthermore, the cargo is likely to fall from the back of the bed if it cannot be adequately secured. At a minimum, this latter occurrence can result in severe damage to the cargo. Of even greater concern is that the transportation of oversized cargo may present a hazard to other motorists if the cargo happens to fall from the bed while the vehicle is in transit.

Often as a temporary solution to the problem, a person will ride in the cargo bed along with the cargo during transit in order to monitor the cargo, and possibly even hold the cargo to prevent its falling from the vehicle. However, this solution not only needlessly exposes persons to potentially life-threatening hazards, but is also an inefficient use of manpower. Therefore, the prior art has suggested various alternatives to allow the safe transportation of oversized cargo in cargo beds that are otherwise inadequate to sufficiently support the length of the cargo.

For example, U.S. Pat. No. 5,826,932, issued on Oct. 27, 1998 to S. DeSimone, describes a bed extension for use with vehicles equipped with cargo beds. The bed extension is configured to enable oversized cargo to be securely carried on a cargo bed. The bed extension is constructed of struts and/or tubing that promotes the structural rigidity of the extension while contributing minimal weight. When stowed, the bed extension occupies the same space as the tailgate of the vehicle.

U.S. Pat. No. 5,857,724, issued on Jan. 12, 1999 to E. R. Jarman, describes an apparatus for extending vehicle cargo areas. This apparatus includes a main panel having a first end adapted for pivotally attaching to a tailgate. The main panel includes non-planar section formed therein. A pair of side walls are pivotally attached opposite sides of the main panel. The apparatus is positionable in a stowed position having the side panels folded into abutment with the main panel such that the non-planar sections of the side walls nest with the non-planar sections of the main panel.

U.S. Pat. No. 6,082,801, issued on Jul. 4, 2000 to Owen et al., describes a tailgate extension assembly that is selectively positionable between a variety of orientations. The extension mechanism includes a tailgate protector mounted onto the vehicle tailgate, an extender frame movably attached to the tailgate protector allowing for separate movement of the extender frame relative to the tailgate protector. Support arms extend between the vehicle and the extender frame for selectively positioning the extender frame relative to the vehicle tailgate and also supporting the extender frame.

U.S. Pat. No. 6,550,836, issued on Apr. 22, 2003 to J. Rigau, describes a vehicle bed modular system for increasing the functionality of the pickup truck bed. This system has a rectangular panel and mounting plates positioned on the interior of the vehicle bed. The mounting plates are positioned so as to permit installation of a rectangular panel alternately in a parallel and vertical orientation relative to the bed of the vehicle.

U.S. Pat. No. 6,550,841, issued on Apr. 22, 2003 to Burdon et al., describes a tailgate bed extender that has a tray mounted on a vehicle tailgate and a rear frame pivotally coupled to the tray. Side arms are pivotally coupled to opposing side edges of the rear frame and are attachable to the vehicle truck bed. A hinge assembly has a rotation axis is movable relative to the tray and joins the rear frame to the tray. The tailgate bed extender is rotatable from a stored position in which the rear frame abuts the tray to a loading position in which the rear frame is at an angle of approximately 270° to the tray.

U.S. Pat. No. 5,468,038, issued on Nov. 21, 1995 to G. M. Sauri, describes a vehicle tailgate extender having an extension member retractably mounted between inner and outer tailgate walls. The extension member is movable between operative and stowed positions in which the stowed position of the extension members is substantially entirely enclosed by the tailgate walls. In the operative position, the extension member extends from an opening at a top surface of the tailgate located intermediate of the tailgate walls.

U.S. Patent Application Publication No. 2002/0121794, published on Sep. 5, 2002, also shows an auxiliary tailgate with a retractable stop. The tailgate is movable between an open frame and an enclosed clam-shell configuration.

It is an object of the present invention to provide a tailgate extension device which is portable.

It is another object of the present invention to provide a tailgate extension device that can be easily applied onto the tailgate of the bed of a pickup truck.

It is a further object of the present invention to provide a tailgate extension device which minimizes damage to the finish on the surfaces of the tailgate.

It is still a further object of the present invention to provide a tailgate extender which provides extra cargo-carrying capacity to the bed of the pickup truck.

It is still a further object of the present invention to provide a tailgate extension device which allows side rails or cargo netting to be secured thereto.

It is a still a further object of the present invention to provide a tailgate extension device which is easy to use, relatively inexpensive and easy to manufacture.

These and other objects and advantages of the present invention will become apparent from a reading of the attached specification and appended claims.

BRIEF SUMMARY OF THE INVENTION

The present invention is a tailgate extension device having a first panel and a second panel hingedly connect to the first panel. A first strap is affixed to the first panel and extends to the second panel. A second strap is affixed to an edge of the first panel and extends to an opposite edge of the first panel. Each of the first and second straps has an adjustable length. The first strap will extend in transverse orientation relative to the second strap. In use, the first panel can be placed upon the top surface of the tailgate of a pickup truck. The second panel is movable between a first position in surface-to-surface contact with the first panel to a second position in which the surface of the second panel extends in coplanar relationship with a surface of the first panel. The first strap extends across the back side of the tailgate. The second strap will also extend along the underside of the tailgate in transverse relationship to the first strap.

In the present invention, the first panel has a flat surface on one side and a flat surface on the opposite side thereof. A hinge will extend across one edge of the first panel. The edge of the first panel opposite the hinge is slightly tapered outwardly between the sides thereof. The sides of the first panel are generally parallel planar relationship. A rubberized surface is affixed to the side of the first panel which serves to contact the top surface of the tailgate.

The second panel also has a flat surface on one side thereof. The second panel has an angled surface opposite to the flat surface. A back edge extends in transverse relationship to the flat surface at the hinge connection of the first panel and the second panel. When the flat surface of the second panel is extended so as to be in coplanar relationship with the flat surface of the first panel, the back edge of the second panel will rest in juxtaposition against the outer edge of the tailgate. A rubberized surface can be applied to this back edge so as to avoid damage to the outer surface of the tailgate.

In the present invention, a third strap can also be affixed to an edge of the first panel so as to extend to an opposite edge of the first panel. This third strap will be in parallel relationship to the second strap. The third strap has an adjustable length so that the third strap, along with the other straps, can be adjustable to the size of the tailgate of the pickup truck. Suitable buckles or other latch mechanisms can be associated with each of the straps of the present invention so as to allow the easy application of the straps around the tailgate of the vehicle.

The present invention can also include the pickup truck which has a tailgate pivotally attached to the rear end of the bed of the pickup truck. The first panel is removably affixed such that the rubberized surface thereof is juxtaposed against the top of the tailgate when the tailgate is in an extended position. The second panel will then extend outwardly of the tailgate. In this position, the back edge will be juxtaposed against the outer edge of the tailgate so as to provide structural support for the tailgate extension. The first strap will extend around the underside of the tailgate. The second and third straps extend across the underside of the tailgate in transverse relationship to the first strap.

When the use of the tailgate extension of the present invention is completed, the straps can be suitably unbuckled so that the device can be removed from the tailgate of the vehicle. The second panel can be rotated about the pivotal connection so that the coplanar flat surface thereof will be rotated to be in juxtaposition against the flat surface of the first panel. A handle can be formed on the back edge of the second panel so as to allow the closed extension device to be suitably moved and stowed.

A gate is hingedly affixed to an end of the second panel opposite the first panel. This gate movable between a first position overlying the second panel and a second position extending transverse to the second panel. In one embodiment of the present invention, a netting has one end affixed to the gate and a bottom edge secured to the first and second panels. The netting includes a first net extending in transverse relationship to the first and second panels when the first and second panels are in the second position and a second netting extending in transverse relationship to the first and second panels when the first and second panel are in the second position. The second netting is in generally parallel planar relationship to the first net. The netting has a top webbing with one end hooked onto a ring at a end of the gate opposite the second panel. The top webbing also has an opposite end suitable for being hooked onto a surface of the vehicle adjacent to the tailgate. The netting has a bottom webbing hooked onto the flat surfaces of the first and second panels when the first and second panels are in second position. The top webbing has a buckle at one end thereof. The netting has a hook extending from this buckle. An extension portion extends from the top webbing through the buckle. The extension portion has another hook at an end thereof. This hook is engaged with one of a plurality of holes formed in the top webbing so as to allow for an adjustment of the length of the netting, as secured to the vehicle.

In another embodiment of the present invention, a first side rail is affixed to one side of the first and second panels and a second side rail is affixed to an opposite side of the first and second panels. The first and second side rails are hingedly connected to the panels so as to be movable between a first position overlying the panels and second position in transverse relationship to the panels.

BRIEF DESCRIPTION OF THE SEVERAL VIEWS OF THE DRAWINGS

FIG. 9 is a side elevational view showing the side rails as secured onto the extension device of the present invention.

FIG. 10 is an end view of the vehicle showing the side rails as movable between a stowed portion and an extended position.

FIG. 11 is a plan view showing the side rails in their stowed positions.

DETAILED DESCRIPTION OF THE INVENTION

Figure 1:
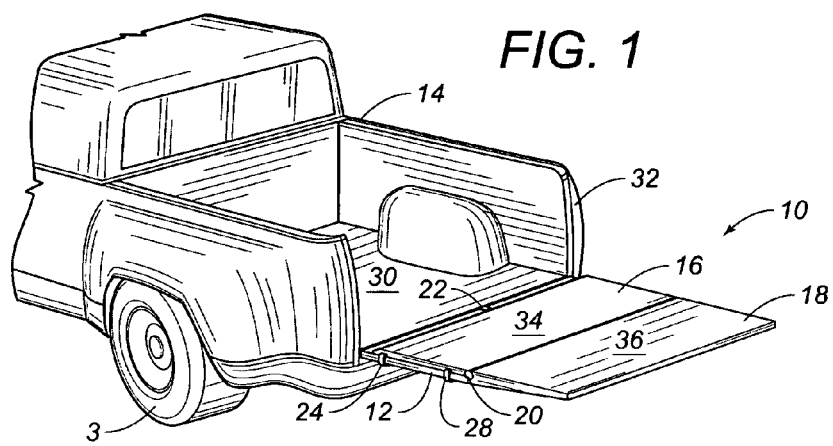
FIG. 1 is a perspective view showing the application of the tailgate extension device of the present invention upon the tailgate of a pickup truck.

Referring to FIG. 1, there is shown the tailgate extension device 10 in accordance with the teachings of the present invention. FIG. 1 shows the tailgate extension device 10 as applied to the tailgate 12 of a pickup truck 14. The tailgate extension device 10 includes a first panel 16 and a second panel 18 having a top surface extending in coplanar relationship to the first panel 16. The second panel 18 is hingedly connected by hinges 20 to the first panel 16. A first strap 26 extends outwardly from an edge 24 of the first panel 16. A second strap 28 extends outwardly from one side edge of the first panel 16 around the tailgate 12 to the opposite side of the first panel 16. A third strap 26 is also affixed to an edge of the first panel 16 and extends around the underside of the tailgate 12 so as to join with the opposite side of the first panel 16.

As can be seen in FIG. 1, the pickup truck 14 has a bed 30 positioned above wheels 33. The tailgate 12 is hingedly connected to the rear end 32 of the pickup truck 14. The tailgate 12 will be pivotable between a position extending outwardly in generally coplanar relationship with the bed 30 and a position juxtaposed against the rear end 32 of the bed 30. The tailgate 12, along with the bed 30 of pickup truck 14, is of a conventional pickup truck type of configuration. In certain circumstances, it is desirable to extend the length of the bed 30 of the pickup truck 14. In one circumstance, all that would be necessary would be for the user to pivot the tailgate 12 to its outwardly extending position in generally coplanar alignment with the bed 30. This will provide a certain degree of extension. However, in other circumstances, greater lengths are required for the extension outwardly of the end of the bed 30 of the pickup truck 14. Under such circumstances, the tailgate extension device 10 of the present invention can be employed.

Initially, the first panel 16 has its back surface resting upon the top surface of the tailgate 12. As such, the upper flat surface 34 is positioned directly above the tailgate 12. The second panel 18 has a top surface 36 which is coplanar with the top surface 34. The use of the straps 26 and 28 serves to secure the first panel 16 upon the top surface of the tailgate 12 in a strong and sturdy configuration. Additional support is provided by the shoulder on the back side of the second panel 18 which will be juxtaposed against the end of the tailgate 12 (in the manner shown in FIG. 2).

After use, the second panel 18 can simply be folded about hinges 20 so that the flat surface 36 is juxtaposed against the flat surface 34 of the first panel 16. The device 10 can be removed from the tailgate 12 or folded inwardly, along with the tailgate, when the tailgate 12 is pivoted upwardly so as to rest against the rear end 32 of the bed 30 of pickup truck 14.

Figure 2:
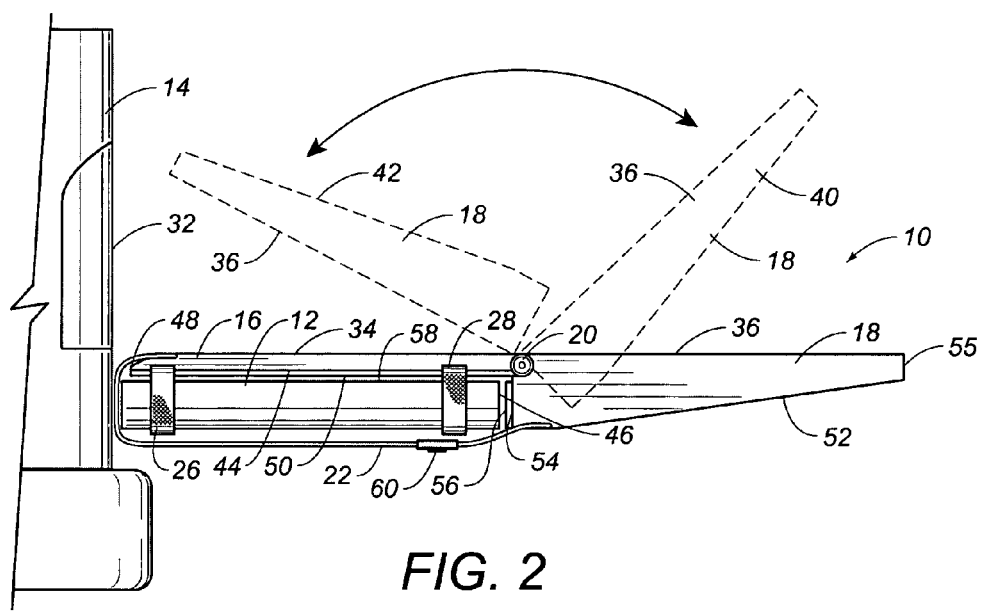
FIG. 2 is a side elevation view showing the application of the device of the present invention upon the tailgate of a pickup truck.

FIG. 2 more specifically illustrates the manner in which the first panel 16 is secured to the tailgate 12 of the pickup truck 14. FIG. 2 also shows how the second panel 18 extends outwardly such that the top surface 36 of the second panel 18 is in coplanar relationship with the top surface 34 of the first panel 16. The broken line sections 40 and 42 illustrate the manner in which second panel 18 moves between its outwardly extended position toward its closed position.

In FIG. 2, it can be seen that the first panel 16 has a generally flat top surface 34. There is an opposite back surface 44 which is in surface-to-surface contact with the top surface 46 of the tailgate 12. A slightly angled end surface 48 is formed at the end of the first panel 16 opposite the hinged connection 20. A rubberized surface 50 is applied to the back side 44 of the first panel 16. This rubberized surface is intended to avoid damage to the finish of the vehicle in the area of the top surface 46 of tailgate 12. The angled surface 48 provides an arrangement which can permit the sliding movement objects outwardly of the bed 30 of the pickup truck 14.

In FIG. 2, it can be seen that the second panel 18 is initially illustrated such that the flat surface 36 is in coplanar relationship with the flat surface 34 of the first panel 16. The second panel 18 has an angled opposite side 52 extending from the back surface 54 to the end edge 55. The back edge 54 extends transverse to the flat surface 36 of the second panel 18. A rubberized surface 56 is applied to the back edge 54 so as to avoid damage to the finish at the end of the tailgate 12. The back surface 54 is also intended to provide additional structural support for any objects that might rest upon the extension section 18 of the extension device 10 of the present invention. In other words, when a weight is applied upon the panel 18, the abutment between the end of the tailgate 12 and the back surface 54 of the second panel 18 will resist downward deflection of the second panel 18.

In FIG. 2, it can be seen that the strap 22 has one end affixed to the angled end edge 48 of the first panel 16. The strap 22 extends in the area between the connection of the tailgate and the rear end 32 of the pickup truck 14, around the bottom surface 58 of the tailgate 12, and connects with the second panel 18 adjacent to the back surface 54. A suitable buckle 60 can be used so as to secure this strap 22 together and to allow for adjustability of the length of the strap 22. FIG. 2 also shows how the strap 26 and the strap 28 are affixed to the side of the first panel 16 and extend across the underside 58 of the tailgate 12.

In FIG. 2, there is illustrated in the broken line illustrations 40 and 42 how the second panel 18 can be pivoted about hinge 20 so as to move from the outwardly deployed position to a stowed position in which the flat surface 36 is juxtaposed against the flat surface 34 of the first panel 16.

Figure 3:
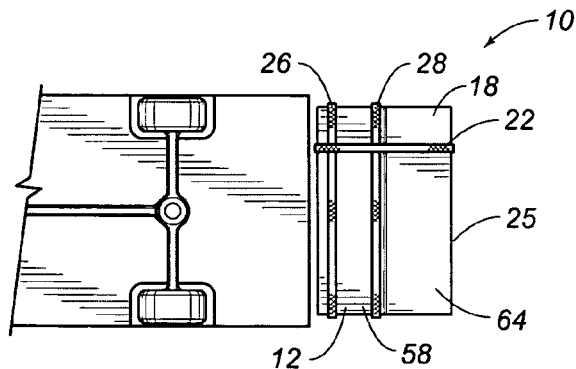
FIG. 3 is a bottom view showing the application of the tailgate extension device of the present invention upon the tailgate of a pickup truck.

FIG. 3 illustrates how the tailgate extension device 10 is secured across the underside 58 of the tailgate 12. It can also be seen how the second panel 18 extends outwardly from the end 64 of the tailgate 12. The strap 22 is illustrated as extending across the underside 58 of the tailgate 12. The strap 24 is also illustrated as extending across the underside 58 of the tailgate 12 in transverse relationship to the strap 22. The strap 28 is further illustrated as extending in generally parallel relationship to the strap 22 and in transverse relationship to the strap 22 across the underside 58 of the tailgate 12.

Figure 4:
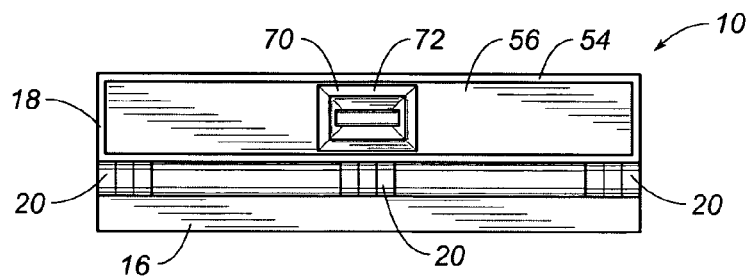
FIG. 4 shows an end view of the tailgate extension device of the present invention showing the panels in the their juxtaposed and closed position.

FIG. 4 illustrates how the tailgate extension 10 is in its folded position for stowage and/or transportation. Importantly, the hinges 20 are connected to the second panel 18 and the first panel 16. The back side 54 of the second panel 18 is illustrated as having a rubberized surface 56 formed thereon. In FIG. 4, it can be seen that a handle 70 is formed within a depression 72 formed on the back surface 54. As a result, a human hand can grasp the handle 70 so as to transport the device 10 from one location to another.

Figure 5:
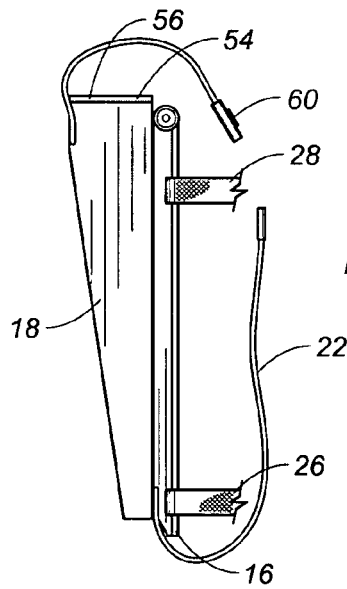
FIG. 5 is a side elevation view of the tailgate extension device of the present invention in the closed position.

FIG. 5 further illustrates a side view of the second panel 18 juxtaposed in surface-to-surface relationship to the panel 12. The first strap 22 is illustrated as unbuckled at buckle 60 so as to allow the device to be suitably removed from the pickup truck. Straps 26 and 28 are illustrated, in broken fashion, as extending outwardly from a side of the first panel 12. The back surface 54 is illustrated as extending in generally transverse relationship to the flat surfaces of the first panel 12. A rubberized surface 56 is applied to the back surface 54.

Figure 6:
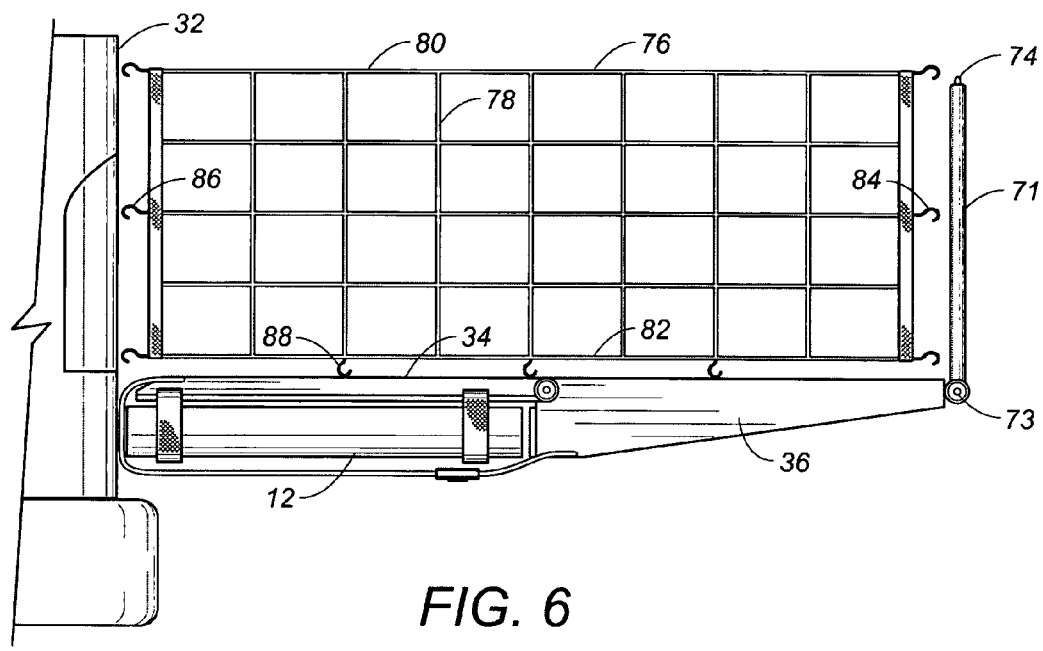
FIG. 6 is a side elevational view showing the netting as secured onto the extension apparatus of the present invention.

FIG. 6 illustrates a first alternative embodiment of the present invention. In FIG. 6 it can be seen that there is a gate 71 that is connected by a hinge 73 to the end of the second panel 36 opposite the first panel 34. The gate 71 is movable between a first position overlying the second panel 36 and a second position, as shown in FIG. 6, extending transverse to the flat top surface of the second panel 36. The gate 71 has a ring 74 on an end opposite the hinge 73. A netting 76 has one end affixed to the gate 71 and an opposite end affixed to the rear end 32 of the pickup truck. As can be seen netting 76 comprises a net 78 having a top webbing 80 and a bottom webbing 82. Suitable hooks 84 extend from one of the net 78 in a suitable condition for engagement with the gate 70. Similarly, hooks 86 extend from the opposite end of the net 78. Hooks 86 are suitable for engagement with the rear end 32 of the pickup truck. The net 78 also includes hooks 88 extending downwardly from bottom webbing 82. Hooks 88 are suitably engaged into the planar surfaces of the first panel 34 and the second panel 36. As a result, the net 78 will extend along one side of the panels 34 and 36 between the gate 71 and the end 32 of the pickup truck so as to retain object within the bed of the pickup truck 32.

Figure 7:
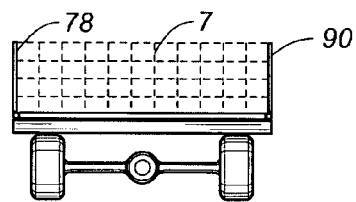
FIG. 7 is an end view of the vehicle showing the first net and the second net extending upwardly from the top surfaces of the extension apparatus of the present invention.

In FIG. 7, it can be seen that the first net 78 extends upwardly from one side of the panel 36. Another net 90 extends upwardly from an opposite side of the panel 36. Net 78 is in parallel planar relationship with the net 90. The gate is illustrated as having a cross-hatched framework. Gate 71 will extend across the end of the second panel 36 so as to enclose the interior of the bed of the pickup truck.

Figure 8:
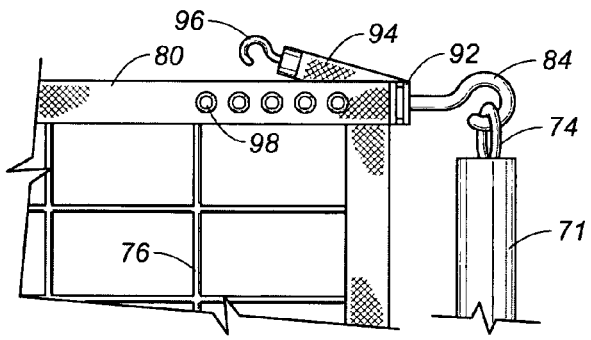
FIG. 8 is a detailed view showing the connection between the top webbing of the netting and the top of the gate at the end of the extension apparatus of the present invention.

FIG. 8 is detailed view showing how the top webbing 80 is engaged by hook 84 with the ring 74 of the gate 71. As can be seen, a buckle 92 is affixed to the end of the top webbing 80. Hook 84 extends outwardly from the buckle 92 so as to suitably engage the ring 74. An extension portion 94 of the top webbing 80 extends through a slot in the buckle 92. Another hook 96 is affixed to the end of the extension portion 94 opposite the buckle 92. The hook 96 can engage one of the plurality of holes 98 formed in the top webbing. As a result, the length of the netting 76 can be adjusted, as required.

FIG. 9 shows another alternative embodiment of the present invention. In FIG. 9, the gate 71 is illustrated in its second position extending generally transverse to the second panel 36. A side rail 100 will extend between the gate 71 and the rear end 32 of the pickup truck. Side rail 100 includes a top rail 102 which is positioned in parallel relationship to the top surfaces of the panels 34 and 36 by vertical rails 104, 106 and 108. Rails 104, 106 and 108 are hingedly connected to the panels 34 and 36 and extend upwardly therefrom. Rail 108 will be adjacent to the gate 71. Rail 104 will be adjacent to the end 32 of the pickup truck.

FIG. 10 illustrates that the side rail 102 will be in generally parallel relationship to the side rail 110. Rails 102 and 110 are movable between a first position stowed within each of the panels 34 and 36. The side rails 102 and 110 can be moved to a position in generally transverse relationship to a surface of the panels 34 and 36.

FIG. 11 illustrates the manner in which the rails 102 and 110 overlie the surface of the panels 34 and 36. Similarly, the gate 71 can be moved to a position overlying the surface of the panel 36.

The foregoing disclosure and description of the invention is illustrative and explanatory thereof. Various changes in the details of the illustrated construction can be made within the scope of the present invention without departing from the true spirit of the invention. The present invention should only be limited by the following claims and their legal equivalents.

The invention claimed is:

1. An extension apparatus for attachment to a tailgate of a vehicle comprising:
    a first panel having a generally flat surface;
    a second panel hingedly connected to said first panel, said second panel having a generally flat surface, said second panel movable between a first position in surface-to-surface contact with said first panel and a second position in which the flat surfaces are in coplanar relationship; and
    a means for securing said first panel to a surface of the tailgate, said means for securing comprising:
        a first strap extending along another surface of said first panel opposite said generally flat surface, said first strap suitable for extending around a portion of the tailgate.

2. The apparatus of claim 1, said means for securing further comprising:
    a second strap extending along said another surface of said first panel in generally parallel relationship to said first strap, said second strap suitable for extending around another portion of said tailgate.

3. The apparatus of claim 1, said means for securing further comprising:
    a transverse another strap extending in transverse relationship to said first strap, said transverse strap having an end affixed to an end of said first panel and an opposite end affixed to said second panel, said transverse strap suitable for extending along another portion of the tailgate.

4. The apparatus of claim 1, said second panel having a back edge having a thickness greater than a thickness of said first panel, said back edge suitable for abutting an end of the tailgate when said second panel is in said second position.

5. The apparatus of claim 4, said second panel having a tapered surface opposite said generally flat surface, said second panel having a thickness greater at said back edge than a thickness at an end of said second panel opposite said first panel.

6. The apparatus of claim 4, said first panel having a rubberized surface opposite said generally flat surface, said second panel having a rubberized surface at said back edge.

7. An extension apparatus for attachment to a tailgate of a vehicle comprising:
    a first panel having a generally flat surface;
    a second panel hingedly connected to said first panel, said second panel having a generally flat surface, said second panel movable between a first position in surface-to-surface contact with said first panel and a second position in which the flat surfaces are in coplanar relationship;
    a means for securing said first panel to a surface of the tailgate; and
    a gate hingedly affixed to an end of said second panel opposite said first panel.

8. The apparatus of claim 7, said gate movable between a first position overlying said second panel and a second position extending transverse to said second panel.

9. The apparatus of claim 8, further comprising:
a netting having a one end affixed to said gate, said netting having a bottom edge secured to said first and second panels.

10. The apparatus of claim 9, said netting comprising:
a first net extending in transverse relationship to said first and second panels when said first and second panels are in said second position on one side of said first and second panels;
a second net extending in transverse relationship to said first and second panels when said first and second panels are in said second position on an opposite side of said first and second panels, said second net being generally parallel planar relationship to said first net.

11. The apparatus of claim 9, said netting having a top webbing with one end hooked onto a ring at an end of said gate opposite said second panel, said top webbing having an opposite end suitable for being hooked onto a surface of the vehicle, said netting having a bottom webbing hooked onto said flat surface of said first and second panels when said first and second panels are in said second position.

12. The apparatus of claim 9, said netting having a top webbing, said top webbing having a buckle at one end thereof, said netting having a hook extending from said buckle, said top webbing having an extension portion extending through said buckle, said extension portion having another hook at an end thereof.

13. The apparatus of claim 8, further comprising:
a first side rail affixed to one side of said first and second panels; and
a second side rail affixed to an opposite side of said first and second panels.

14. The apparatus of claim 13, said first and second side rails each being hingedly connected to said first and second panels so as to be movable between a first position overlying said first and second panels and a second position in transverse relationship to said first and second panels.

15. An apparatus comprising:
a vehicle having a tailgate, said tailgate movable between a vertical position and a horizontal position;
a first panel overlying a surface of said tailgate when said tailgate is in said horizontal position; and
a second panel hingedly connected to said first panel, said second panel movable between a first position in surface-to-surface relation to said first panel and a second position extending outwardly of said tailgate, said first panel having a generally flat surface, said second panel having a generally flat surface, said surfaces being in coplanar relationship to each other when said first and second panels are in the second position, said first panel having a rubberized surface juxtaposed against a top surface of said tailgate when said tailgate is in said horizontal position and when said second panel is in said second position, said second panel having a rubberized surface juxtaposed against an end of said tailgate when said tailgate is in said horizontal position.

16. The apparatus of claim 15, further comprising:
a means for securing affixed to said first panel for securing said first panel to a surface of said tailgate.

17. The apparatus of claim 15, said second panel having a back edge having a thickness greater than a thickness of said first panel, said back edge abutting an end of said tailgate when said tailgate is in said horizontal position and when said second panel is in the second position.

* * * * *